T. F. BLACKWELL.
FEED WATER HEATER.
No. 179,676.             Patented July 11, 1876.
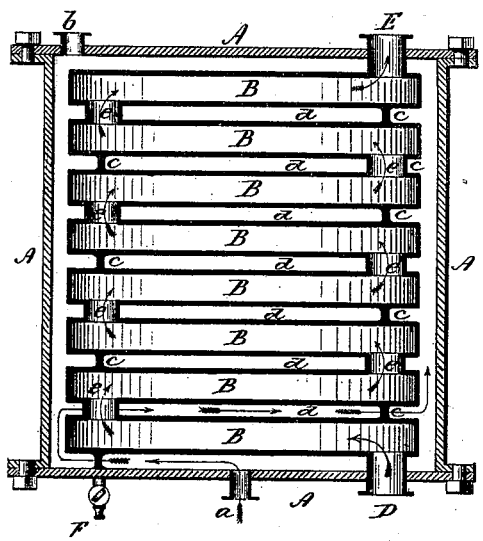

UNITED STATES PATENT OFFICE.

TOBIAS F. BLACKWELL, OF NEW HAVEN, CONNECTICUT, ASSIGNOR TO THE WATERS PATENT HEATER COMPANY, OF SAME PLACE.

IMPROVEMENT IN FEED-WATER HEATERS.

Specification forming part of Letters Patent No. 179,676, dated July 11, 1876; application filed March 2, 1876.

*To all whom it may concern:*

Be it known that I, TOBIAS F. BLACKWELL, of New Haven, in the county of New Haven and State of Connecticut, have invented a new Improvement in Feed-Water Heaters; and I do hereby declare the following, when taken in connection with the accompanying drawings and the letters of reference marked thereon, to be a full, clear, and exact description of the same, and which said drawings constitute part of this specification, and represent a vertical central section.

This invention relates to an improvement in what are called feed-water heaters—that is to say, an apparatus for heating water before its introduction into the steam-boiler; and it consists in a series of hollow circular disks arranged within a casing, each successive disk connecting with the next at points diametrically opposite and arranged at a slight distance apart, so that steam admitted into the lower disk passes and fills each successive disk until it arrives at the exit at the top, while the water admitted into the case flows around each successive disk until it has been exposed to all, and then passes out heated to nearly the temperature of the steam within the disks.

A is a casing inclosing a chamber, and of dimensions according to the amount of water to be heated, with an aperture, *a*, at the bottom, connecting with a supply-pipe and a similar aperture, *b*, at the top, through which the water passes out. Within this chamber is arranged a succession of disks, B, more or less in number, and of a diameter a little less than the internal diameter of the chamber. These disks are cast hollow, so that each forms a chamber of itself, and are arranged one above another, so as to leave a slight space, *d*, between. These disks are connected one with another at points *e*, diametrically opposite one another, so that a communication is opened from each disk to to the next, all these communicating. Several supports, *c*, are arranged between the disks to hold them in their proper relative position to each other. The lower disk has an opening, D, through which steam is admitted to that disk, and the upper disk has a corresponding aperture or outlet, E, through which the steam escapes.

Exhaust or live steam is permitted to pass through the aperture D, thus filling all the disks and escaping through the aperture E, heating the surrounding chamber to nearly the temperature of the steam. Water is forced through the chamber, filling the spaces between the disks, and finally passing through the aperture *b* to the boiler, heated to nearly the temperature of the steam.

This construction affords a very large amount of heating-surface within a limited space. The disks are easily cast, and by passing the steam through the disks, so large a portion of the surface within the chamber is made a radiating surface, and the space for water so small, that the water passes from the heater at nearly the same temperature as the escaping steam. The draw-off cock F is arranged at a lower point in the chamber.

I am aware that a circulation through chambers or tubes connected at opposite points, arranged within a surrounding casing, is not new, but I am not aware that a succession of disks, such as herein shown and described, have ever been thus arranged so that it was made practicable to circulate the steam instead of the water through the inclosed or circulating chambers.

I claim—

In a feed-water heater the combination of the outer casing A, constructed with water inlet and exit, and a series of hollow disks, arranged one above another, and so as to leave a space between them, and each disk connected with the next at a point diametrically opposite its connection with the preceding disk, and with steam inlet and exit, respectively, to the two extreme disks, substantially as described.

TOBIAS F. BLACKWELL.

Witnesses:
JOHN E. EARLE,
CLARA BROUGHTON.